Patented Aug. 15, 1944

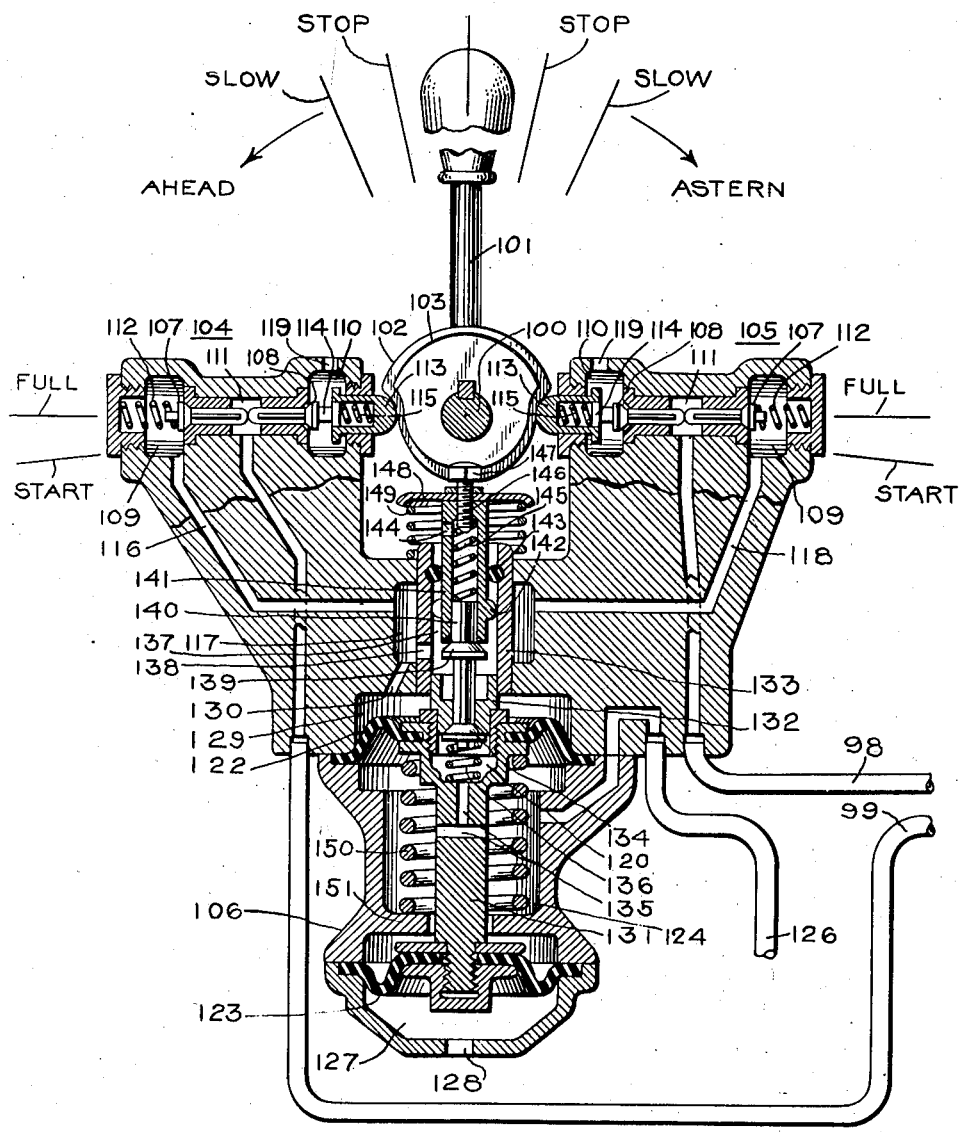

2,355,758

UNITED STATES PATENT OFFICE 2,355,758

CONTROL VALVE DEVICE

Roy R. Stevens, Forest Hills, Pa., assignor to The Westinghouse Air Brake Company, Wilmerding, Pa., a corporation of Pennsylvania Original application October 29, 1942, Serial No. 463,792. Divided and this application October 2, 1943, Serial No. 504,702

7 Claims. (Cl. 137—144)

This invention relates to control valve devices and more particularly to the manually operative type for controlling pressure of fluid in a plurality of pipes; the present application being a division of my copending application Serial No. 463,792, filed October 29, 1942.

The principal object of the invention is the provision of an improved control device of the above type arranged to provide for varying pressure of fluid in either of two pipes while maintaining the other pipe at constant pressure, as open to atmosphere.

Other objects and advantages will be apparent from the following more detailed description of the invention.

In the accompanying drawing; the single figure is a diagrammatic sectional view of the improved control device.

Description

As shown in the drawing, the improved control device comprises a casing in which a rock shaft 100 is journaled. A lever 101 is secured to shaft 100 to turn same to a plurality of different positions such as indicated by lines and legends in the drawing. Two cams 102 and 103 are secured to turn with the shaft 100, the cam 102 being provided to control the operation of two directional control or selector valve devices 104 and 105 which are operative in accordance with the direction of movement of lever 101 from its neutral position shown to selectively connect either one of two control pipes 98 or pipe 99 to a self-lapping valve device 106 and to open the other of said pipes to atmosphere, the self lapping valve device 106 being controlled by the cam 103.

The directional control valve devices 104 and 105 are located in the casing opposite each other and at opposite sides of the cam 102. Both of these devices may be of identical construction each comprising two oppositely seating poppet valves 107 and 108 contained in chambers 109 and 110, respectively, and having axially aligned fluted stems engaging each other in a chamber 111. A spring 112 in chamber 109 acts on the valve 107 for seating same and for at the same time unseating the valve 108. A plunger 113 is slidably mounted in the casing and has one end engaging cam 102 while the opposite end is disposed in chamber 110. This plunger carries a pressure member 114 which engages the valve 108 and a spring 115 acting on the pressure member for operating same to seat said valve and unseat the valve 107 upon movement of plunger 113 in the direction of said valves. With the lever 101 and cam 102 in their neutral positions shown in Fig. 1, the plunger 113 is permitted to move away from the valve 108 to provide for seating of valve 107 and unseating of valve 108 by spring 112.

Initial movement of lever 101 in the direction of the left hand from a neutral position in which it is shown will actuate cam 102 and thereby the plunger 113 of the valve device 104 in the direction of valve 108 for seating said valve and unseating the valve 107, this change in condition of the respective valves being obtained by the time the lever 101 obtains the position indicated by the legend "Stop" and being then maintained in all positions of said lever beyond the "Stop" position. Movement of lever 101 in the direction of the right hand is adapted to seat valve 108 and unseat valve 107 in the valve device 105 by the time the lever 101 obtains the "Stop" position at the right hand side of its neutral position and this condition of these valves is then adapted to be maintained in all positions of said lever beyond the "Stop" position. When the lever 101 is rocked toward the left hand for seating the valve 108 and unseating the valve 107 of the valve device 104, the cam 102 provides for the valve 108 in the valve device 105 remaining open and the valve 107 remaining closed. When the lever 101 is moved toward the right hand to actuate the valve device 105 the valve 108 in the valve device 104 is adapted to remain open while the valve 107 is adapted to remain closed.

Chamber 109 in the valve device 104 is connected by a passage 116 to a chamber 117 and the corresponding chamber 109 in the valve device 105 is also connected to chamber 117 by a passage 118. Chamber 111 in the valve device 104 is connected to the control pipe 99 while the corresponding chamber in valve device 105 is connected to the control pipe 98. Chamber 110 in each of the valve devices 104 and 105 is open to the atmosphere through a passage 119.

From the above description it will be seen that upon movement of lever 101 from its neutral position shown in the direction of the left hand the valve device 104 will connect control pipe 99 to chamber 117 while the valve device 105 will open the control pipe 98 to the atmosphere. On the other hand if lever 101 is rocked in the direction of the right hand from neutral position the valve device 105 will connect the control pipe 98 to chamber 117 while the valve device 104 will connect the control pipe 99 to the atmosphere.

The self-lapping valve device 106 is provided for supplying fluid under pressure to chamber 117 and thereby to either pipe 98 or 99 as determined by the direction of movement of the control lever 101 and the consequent operation of the directional control valve devices 104 and 105.

The self-lapping valve device 106 comprises two spaced and axially aligned flexible diaphragms 122 and 123 which are rigidly clamped around their peripheries in the casing. Between these diaphragms is a chamber 124 which is constantly supplied with fluid from a supply pipe 126 at any desired pressure such as 100 pounds per square inch. At the opposite side of the diaphragm 123 is a chamber 127 which is constantly open to the atmosphere through a passage 128 while at the opposite side of diaphragm 122 is a chamber 129 in constant communication through a port 130 with chamber 117.

A stem 131 in chamber 124 has one end clamped to the diaphragm 123 while the opposite end is clamped to the diaphragm 122, the means clamping said stem to diaphragm 122 embodying a guide element 132 projecting through chamber 129 and slidably mounted in a bore in the lower end of a sleeve 133 which is secured in the casing in axial alignment with the two diaphragms 122 and 123 and directly below the operating shaft 100 and cam 103.

A poppet valve 134 is contained in chamber 120 in the upper end of stem 131, which chamber is constantly supplied with fluid under pressure from chamber 124 by way of passages 135 in the stem 131. Chamber 120 also contains a spring 136 acting on the valve 134 for urging same upwardly toward a seat provided on the adjacent end of the guide element 132.

The valve 134 has a fluted stem extending through a suitable bore in the guide element 132 into a chamber 137 provided in sleeve 133. The chamber 137 is constantly open through one or more ports 138 in sleeve 133, to the chamber 117 which encircles said sleeve. A release valve 139 in chamber 137 engages the end of the fluted stem of valve 134 and in turn has a fluted stem 140 mounted to slide in a bore in a plunger 141. The plunger 141 is mounted to slide in sleeve 133 and has suitable guide portions 142 slidably engaging the inner wall of sleeve 133. A ring shaped packing 143 disposed above the guide portions 142 is expanded into an annular groove provided in the inner wall of sleeve 133 and has sliding contact with the outer surface of plunger 141 for preventing leakage of fluid under pressure from chamber 137 along said plunger and out of the upper open end of sleeve 133. The bore in plunger 141 is open above the packing 143 to the atmosphere through one or more ports 144 and said bore contains a spring 145 acting on stem 140 of the release valve 139 urging said valve in a direction out of said bore and thus away from its seated or closed position against the end of said plunger.

An adjusting screw 146 is screw-threaded into the upper end of plunger 141 and has a head 147 which engages the cam 103. A spring seat 148 is secured to the plunger 141 above the end of sleeve 143 and interposed between this seat and the casing is a bias spring 149 which is operative against the spring seat 148 with a force just sufficient to urge the plunger 141 out of seating engagement with the release valve 139, as shown in the drawing.

In chamber 124 between the two flexible diaphragms 122 and 123 is a coil control spring 150 encircling the stem 131 and having one end supported on an annular ledge 151 in the casing while the opposite end acts against the diaphragm 122 for urging same in the direction of sleeve 133. This spring is adapted to be fully expanded with the parts in the position shown in the drawing, assumed when the lever 101 is in its neutral position shown, and to oppose all movement of the diaphragms in a downwardly direction from this position. The two diaphragms 122 and 123 are of equal areas so that the pressure of fluid in chamber 124 acting on the diaphragm 122 is opposed and balanced by said fluid pressure acting on the diaphragm 123. Thus spring 150 provides the only force for opposing movement of the diaphragms in a downwardly direction.

*Operation*

With the lever 101 of the control valve device in its neutral position shown, the spring 149 acting on seat 148 will urge plunger 141 to the position shown in which said plunger is pulled away from the release valve 139 due to the action of spring 145 on said valve and also to the fact that the control spring 150 is expanded to its free height thus removing the force on said valve tending to urge same in an upwardly direction. Under this condition the spring 136 will hold the supply valve 134 in contact with its seat and chambers 117 and 129 will both be open to the atmosphere through ports 138, past the release valve 139 and thence through the bore in plunger 141 and ports 144.

With the control lever 101 in its neutral position the directional control valve devices 104 and 105 will both occupy the positions shown in which the valves 108 are unseated so that both control pipes 98 and 99 will be open to the atmosphere.

If the operator desires to supply fluid under pressure to control pipe 99 while retaining pipe 98 open to the atmosphere, he moves the lever 101 from its neutral position in a counter-clockwise direction, or in a direction indicated by the arrow bearing the legend "Ahead," to the position indicated by the legend "Start." The initial movement of lever 101 out of neutral position actuates the cam 102 to reverse the valves of the directional control valve device 104 to thereby place the control pipe 99 in communication through passage 116 with chamber 117, while the directional control valve device 105 remains in the condition shown opening the control pipe 98 to the atmosphere.

As the lever 101 is thus moved to "Start" position the cam 103 initially operates through the adjusting screw 146 to move the plunger 141 into contact with the release valve 139 and to then move said valve along with said plunger to unseat the valve 134. The cam 103 is so designed that the supply valve 134 will thus be unseated before the lever 101 obtains the stop position.

With the valve 134 unseated as just described fluid under pressure will flow from chamber 124 between the diaphragms past said valve to chamber 137 within sleeve 133 and then through passages 138 to chamber 117 and from chamber 117 through passage 116 and past valve 107 in the directional control valve device 104 to pipe 99. At the same time as fluid under pressure is thus supplied to chamber 117, it also flows through port 130 to chamber 129 at the top of diaphragm 122 and acts on said diaphragm to deflect same in a downwardly direction against spring 150 thus tending to pull the guide element 132 into seating engagement with the supply valve 134.

Such seating of valve 134 may be provided for by the time the pressure of fluid in chamber 129 and thus in the control pipe 99 is built up to a chosen degree such as seventy-five pounds, or if desired, the cam 103 may be so designed as to maintain valve 134 open with the lever 101 in "start" position so that fluid at the relatively high pressure, of for instance one-hundred pounds, supplied through pipe 126 to chamber 124 may be obtained in the control pipe 99.

If the operator now desires to reduce the pressure of fluid in pipe 99 he may move the lever 101 to the "full" position at the "ahead" side of the neutral position. This movement of the lever turns cam 103 so as to permit spring 149 acting on seat 148 to move plunger 141 upwardly to a position determined by the distance the lever is out of neutral position, this movement of the plunger being away from the exhaust valve 139, since said valve will be held against movement at the time by the pressure of spring 145 and due to the fact that the pressure of fluid in chamber 129 above diaphragm 122 equals at least the opposing force of spring 150.

When the exhaust valve 139 is thus unseated, fluid under pressure will be released from pipe 99 through the directional control valve device 104 and past the release valve 139 to the atmosphere. As the pressure of fluid in pipe 99 is thus reduced a like reduction occurs in chamber 129 above the diaphragm 122 by way of port 130, and this permits spring 150 to urge the diaphragms and the exhaust valve 139 in an upwardly direction toward plunger 141, and said valve will become seated against said plunger when the pressure of fluid in pipe 99 becomes reduced to a degree determined by the position of lever 101, cam 103 and thereby of plunger 141. In "full" position of lever 101, the pressure of fluid thus provided or retained in pipe 99 may for instance be fifty-two pounds.

If the lever 101 is moved to "slow" position, the greater displacement of plunger 141 by spring 149, will permit the pressure in pipe 99 to be reduced to a degree such as seventeen pounds. A proportionally greater pressure will be provided or maintained in pipe 99 in any position of lever 101 between "full" and "slow" positions, as will be readily apparent.

If the lever 101 is turned to "stop" position, the cam 103 provides for further upward movement of plunger 141 by spring 149 to again unseat the release valve 139, and the self-lapping valve structure 106 will then again operate in the manner above described to effect a further reduction in pressure in pipe 99, to a degree such as ten pounds. Return of lever 101 to its neutral position will allow complete release of fluid under pressure from pipe 99 since under this condition the spring 150 becomes fully expanded without seating the release valve 139.

If the lever 101 is now moved from its neutral position in a clockwise direction or in the direction indicated by the legend "Astern," the directional control device 105 is initially operated to connect pipe 98 to chamber 117, while the directional control device 104 remains in the condition opening pipe 99 to atmosphere. The cam 103 is so designed as to provide for the same operation of the self-lapping valve device 106 in the different positions of the lever 101 at the "astern" side of neutral position as in the correspondingly named positions at the "ahead" side of neutral, whereby any desired degree of pressure may be provided in pipe 98, as will be apparent.

*Summary*

It will now be seen that if the pipes 98 and 99 are connected to a device arranged to provide certain desired operations in response to different chosen pressures of fluid in either one of said pipes, while the other pipe is open to atmosphere, such pressures may be selectively provided by proper operation of the control device. Movement of lever 101 in one direction from a neutral position will provide such pressures in one pipe, while movement in the opposite direction will provide like pressures in the other pipe; the pipe not being used for control being maintained open to the atmosphere.

The directional control valve devices are of simple inexpensive poppet type and it will be noted that these devices are operated by initial movement of the lever out of neutral positions and then merely maintained in such condition during further movement of the lever for operating the self-lapping control device 106 and hence have no material effect upon the effort required on said lever for operating said self-lapping valve device.

Having now described my invention, what I claim as new and desire to secure by Letters Patent, is:

1. A control valve device for varying the pressure of fluid in either one or another of two pipes comprising a casing, fluid pressure control valve means in said casing operable to supply and release fluid under pressure, selector valve means in said casing for directing fluid provided by said control valve means to either one or the other of said pipes, a lever in said casing connected to both of said valve means and operable upon initial movement from a neutral position in one direction to effect operation of said selector valve means to connect said control valve means to one of said pipes and to disconnect said control valve means from the other pipe and operable upon initial movement from said neutral position in the opposite direction to effect operation of said selector valve means to connect said control valve means to said other pipe and to disconnect same from said one pipe, said lever being operable upon movement further from neutral position in either direction to effect operation of said control valve means to supply fluid under pressure to or to release fluid under pressure from the pipe connected thereto, the connection between said lever and selector valve means providing for movement of said lever relative to said selector valve means after the said initial movement in either direction from said neutral position.

2. A control valve device for varying the pressure of fluid in either one or another of two pipes comprising a casing, fluid pressure control valve means in said casing operable to supply and release fluid under pressure, selector valve means in said casing for directing fluid provided by said control valve means to either one or the other of said pipes, a lever in said casing having a neutral position and being movable in either direction from neutral position, cam means operable by said lever upon an initial increment of movement of said lever in one direction from neutral position to effect operation of said selector valve means to connect said control valve means to one of said pipes and to close communication between said control valve means and the other pipe and operable upon an initial increment of movement of said lever in the opposite direction from neutral position to effect operation of said selector valve means to connect said control valve means to said other pipe and to close communication between said control valve means and said one pipe, said cam means providing for further movement of said lever relative to and without operation of said selector valve means in either direction after the said initial increments of movement, and means operable upon movement of said lever in either direction from neutral position to effect operation of said control valve means to supply fluid under pressure to and to release fluid under pressure from said selector valve means for governing the pressure of fluid in the pipe which is connected to said control valve means.

3. A control valve device for varying the pressure of fluid in either one or another of two pipes comprising a casing, fluid pressure control valve means in said casing operable to supply and release fluid under pressure, selector valve means in said casing for directing fluid provided by said control valve means to either one or the other of said pipes, a lever in said casing having a neutral position and being movable in either direction from neutral position, cam means operable by said lever upon an initial increment of movement of said lever in one direction from neutral position to effect operation of said selector valve means to connect said control valve means to one of said pipes and to close communication between said control valve means and the other pipe and operable upon an initial increment of movement of said lever in the opposite direction from neutral position to effect operation of said selector valve means to connect said control valve means to said other pipe and to close communication between said control valve means and said one pipe, said cam means providing for further movement of said lever relative to and without operation of said selector valve means in either direction after the said initial increments of movement, means operable with said lever and cam means in neutral position to effect operation of said selector valve means to open both of said pipes to atmosphere and operative upon movement of said lever in either direction from neutral position to open to atmosphere the one of said pipes which is disconnected from said control valve means, and means operable upon movement of said lever in either direction from neutral position to effect operation of said control valve means to supply fluid under pressure to and to release fluid under pressure from said selector valve means for governing the pressure of fluid in the pipe which is connected to said control valve means.

4. A control device for selectively controlling the pressure of fluid in either of two pipes comprising a casing, fluid pressure control valve means operable to supply fluid under pressure to and release fluid under pressure from a chamber in said casing, selector valve means selectively operable to open one of said pipes to said chamber and at the same time open the other to atmosphere, or to open the said other pipe to said chamber and at the same time to open said one pipe to atmosphere, said selector valve means being also operable to open both of said pipes to atmosphere at the same time, cam means for controlling said selector valve means and having a neutral position for effecting operation of said selector valve means to open both of said pipes to atmosphere and being operable upon an initial increment of movement from neutral position in one direction to effect operation of said selector valve means to open said one pipe to said chamber and in the opposite direction to effect operation of said selector valve means to open said other pipe to said chamber, said cam means being movable further in either direction from neutral position relative to and without operating said selector valve means, a lever for operating said cam means, and other cam means operable by said lever upon movement thereof in either direction from neutral position to effect operation of said control valve means to provide fluid in said chamber at a pressure corresponding to the extent of such movement from neutral position.

5. A manually operative control valve device for supplying fluid under pressure to either one or the other of two pipes comprising a casing, supply valve means operable to supply fluid under pressure for supply to said pipes, one selector valve means controlling communication between one of said pipes and said supply valve means and atmosphere, a second selector valve means controlling communication between the other of said pipes and said supply valve means and atmosphere, and a lever journaled in said casing and operable upon movement in one direction to actuate the first named selector valve means to open said one pipe to said supply valve means and to actuate said supply valve means for supplying fluid under pressure to the connected pipe, said lever means being operable upon movement in another direction to operate said second named selector valve means for connecting the other pipe to said supply valve means and for also operating said supply valve means for supplying fluid under pressure to said other pipe, and means for actuating the selector valve device not operated by said lever to open the respective pipe to atmosphere.

6. A control valve device for selectively supplying fluid under pressure to either one or the other of two pipes while opening the other pipe to atmosphere comprising in combination, a casing, a valve device operable to supply fluid under pressure to a chamber, one valve means controlling communication between one of said pipes and said chamber and atmosphere, a second valve means controlling communication between the other of said pipes and said chamber and atmosphere, means normally actuating each of said valve means for opening the respective pipes to atmosphere, a lever journaled in said casing, and cam means associated with said lever operative upon movement thereof in one direction to actuate said one valve means to connect said one pipe to said chamber and to also actuate said valve device for supplying fluid under pressure to said chamber, said cam means being operable by said lever upon movement in a different direction to actuate the other valve means for connecting the respective pipe to said chamber and to also actuate said valve device for supplying fluid under pressure to said chamber.

7. A control valve device for selectively controlling the pressure of fluid in two pipes comprising a casing, one poppet valve means in said casing operative to selectively open one of said pipes either to atmosphere or to a chamber, a second poppet valve means in said casing operable to selectively open the other of said pipes either to atmosphere or to said chamber, actuating means for operating each poppet valve means to the position for opening the respective pipe to the atmosphere, a shaft journaled in said casing, a cam on said shaft for controlling both of said poppet valve means, a lever for operating said shaft and cam, said cam and lever having a neutral position providing for operation of both poppet valve means by their respective actuating means and being operative upon movement in one direction from neutral position to actuate said one poppet valve means to connect the respective pipe to said chamber and providing for operating of the other poppet valve means by the respective actuating means, and being operative upon movement in the opposite direction from neutral position to operate the said other poppet valve means to connect the respective pipe to said chamber and providing for operation of said one poppet valve means by its respective actuating means, valve means comprising a movable member operable to provide fluid in said chamber at a pressure proportional to movement of said member from a normal position, a second cam on said shaft for controlling said movable member and providing for movement of said member to its normal position with said cam and lever in said neutral position, said cam and lever being operative upon movement in either direction from neutral position to move said movable member from normal position an amount proportional to the movement of said lever.

ROY R. STEVENS.